(12) United States Patent
Lebow

(10) Patent No.: US 7,921,357 B2
(45) Date of Patent: *Apr. 5, 2011

(54) HIGHLIGHTING COMPARISON METHOD

(76) Inventor: David G. Lebow, Tallahassee, FL (US)

( * ) Notice: Subject to any disclaimer, the term of this patent is extended or adjusted under 35 U.S.C. 154(b) by 1319 days.

This patent is subject to a terminal disclaimer.

(21) Appl. No.: 11/453,405

(22) Filed: Jun. 15, 2006

(65) Prior Publication Data

US 2006/0236240 A1 Oct. 19, 2006

Related U.S. Application Data

(63) Continuation-in-part of application No. 10/153,939, filed on May 23, 2002, now Pat. No. 7,080,317.

(51) Int. Cl.
*G06N 3/00* (2006.01)
(52) U.S. Cl. ........................................................ 715/234
(58) Field of Classification Search .................. 715/234, 715/243, 254
See application file for complete search history.

(56) References Cited

U.S. PATENT DOCUMENTS

| | | | |
|---|---|---|---|
| 5,893,132 A | 4/1999 | Huffman et al. | |
| 6,177,945 B1 | 1/2001 | Pleyer | |
| 6,268,851 B1 | 7/2001 | Bricklin et al. | |
| 6,839,665 B1 * | 1/2005 | Meyers | 704/9 |
| 6,877,137 B1 * | 4/2005 | Rivette et al. | 715/230 |
| 2001/0042098 A1 * | 11/2001 | Gupta et al. | 709/206 |
| 2002/0105532 A1 * | 8/2002 | Oblinger | 345/701 |
| 2002/0167534 A1 | 11/2002 | Burke | |

* cited by examiner

*Primary Examiner* — Kyle R Stork
(74) *Attorney, Agent, or Firm* — J. Wiley Horton

(57) ABSTRACT

A method for processing and displaying individual views of the application of pre-defined criteria to textual, graphical, video, or audio material. The use of visually-differentiated emphasis to display similarities and differences can take a variety of forms, including color-coded highlighting, underlining, circling, or the insertion of graphical symbols.

15 Claims, 19 Drawing Sheets

(16 of 19 Drawing Sheet(s) Filed in Color)

Justice Thomas delivered the opinion of the Court:

Nearly 50 years ago, this Court in Graver Tank & Mfg. Co. v. Linde Air Products Co., 339 U.S. 605, 70 S.Ct. 854, 94 L.Ed. 1097 (1950), set out the modern contours of what is known in patent law as the "doctrine of equivalents." Under this doctrine, a product or process that does not literally infringe upon the express terms of a patent claim may nonetheless be found to infringe if there is equivalence between the elements of the accused product or process and the claimed elements of the patented invention. Id., at 609, 70 S.Ct., at 856-857. Petitioner, which was found to have infringed upon respondent's patent under the doctrine of equivalents, invites us to speak the death of that doctrine. We decline that invitation. The significant disagreement within the Court of Appeals for the Federal Circuit concerning the application of Graver Tank suggests, however, that the doctrine is not free from confusion. We therefore will endeavor to clarify the proper scope of the doctrine. ——26

——26

I

The essential facts of this case are few. Petitioner Warner-Jenkinson Co. and respondent Hilton Davis Chemical Co. manufacture dyes. Impurities in those dyes must be removed. Hilton Davis holds United States Patent No. 4,560,746 ('746 patent), which discloses an improved purification process involving "ultrafiltration." The '746 patent filters impure dye through a porous membrane at certain pressures and pH levels, [FN1] resulting in a high purity dye product.

> FN1. The pH, or power (exponent) of Hydrogen, of a solution is a measure of its acidity or alkalinity. A pH of 7.0 is neutral; a pH below 7.0 is acidic; and a pH above 7.0 is alkaline. Although measurement of pH is on a logarithmic scale, with each whole number difference representing a ten-fold difference in acidity, the practical significance of any such difference will often depend on the context. Pure water, for example, has a neutral pH of 7.0, whereas carbonated water has an acidic pH of 3.0, and concentrated hydrochloric acid has a pH approaching 0.0. On the other end of the scale, milk of magnesia has a pH of 10.0, whereas household ammonia has a pH of 11.9. 21 Encyclopedia Americana 844 (Int'l ed. 1990).

FIG. 2

Justice Thomas delivered the opinion of the Court:

Nearly 50 years ago, this Court in Graver Tank & Mfg. Co. v. Linde Air Products Co., 339 U.S. 605, 70 S.Ct. 854, 94 L.Ed. 1097 (1950), set out the modern contours of what is known in patent law as the "doctrine of equivalents." Under this doctrine, a product or process that does not literally infringe upon the express terms of a patent claim may nonetheless be found to infringe if there is equivalence between the elements of the accused product or process and the claimed elements of the patented invention. Id., at 609, 70 S.Ct., at 856-857. Petitioner, which was found to have infringed upon respondent's patent under the doctrine of equivalents, invites us to speak the death of that doctrine. We decline that invitation. The significant disagreement within the Court of Appeals for the Federal Circuit concerning the application of Graver Tank suggests, however, that the doctrine is not free from confusion. We therefore will endeavor to clarify the proper scope of the doctrine.

I

The essential facts of this case are few. Petitioner Warner-Jenkinson Co. and respondent Hilton Davis Chemical Co. manufacture dyes. Impurities in those dyes must be removed. Hilton Davis holds United States Patent No. 4,560,746 ('746 patent), which discloses an improved purification process involving "ultrafiltration." The '746 patent filters impure dye through a porous membrane at certain pressures and pH levels, [FN1] resulting in a high purity dye product.

> FN1 The pH, or power (exponent) of Hydrogen, of a solution is a measure of its acidity or alkalinity. A pH of 7.0 is neutral; a pH below 7.0 is acidic; and a pH above 7.0 is alkaline. Although measurement of pH is on a logarithmic scale, with each whole number difference representing a ten-fold difference in acidity, the practical significance of any such difference will often depend on the context. Pure water, for example, has a neutral pH of 7.0, whereas carbonated water has an acidic pH of 3.0, and concentrated hydrochloric acid has a pH approaching 0.0. On the other end of the scale, milk of magnesia has a pH of 10.0, whereas household ammonia has a pH of 11.9. 21 Encyclopedia Americana 844 (Int'l ed. 1990).

FIG. 3

Justice Thomas delivered the opinion of the Court:

Nearly 50 years ago, this Court in Graver Tank & Mfg. Co. v. Linde Air Products Co., 339 U.S. 605, 70 S.Ct. 854, 94 L.Ed. 1097 (1950), set out the modern contours of what is known in patent law as the "doctrine of equivalents." Under this doctrine, a product or process that does not literally infringe upon the express terms of a patent claim may nonetheless be found to infringe if there is equivalence between the elements of the accused product or process and the claimed elements of the patented invention. Id., at 609, 70 S.Ct. at 856-857. Petitioner, which was found to have infringed upon respondent's patent under the doctrine of equivalents, invites us to speak the death of that doctrine. We decline that invitation. The significant disagreement within the Court of Appeals for the Federal Circuit concerning the application of Graver Tank suggests, however, that the doctrine is not free from confusion. We therefore will endeavor to clarify the proper scope of the doctrine.

I

The essential facts of this case are few. Petitioner Warner-Jenkinson Co. and respondent Hilton Davis Chemical Co. manufacture dyes. Impurities in those dyes must be removed. Hilton Davis holds United States Patent No. 4,560,746 ('746 patent), which discloses an improved purification process involving "ultrafiltration." The '746 patent filters impure dye through a porous membrane at certain pressures and pH levels, [FN1] resulting in a high purity dye product.

> FN1 The pH, or power (exponent) of Hydrogen, of a solution is a measure of its acidity or alkalinity. A pH of 7.0 is neutral; a pH below 7.0 is acidic; and a pH above 7.0 is alkaline. Although measurement of pH is on a logarithmic scale, with each whole number difference representing a ten-fold difference in acidity, the practical significance of any such difference will often depend on the context. Pure water, for example, has a neutral pH of 7.0, whereas carbonated water has an acidic pH of 3.0, and concentrated hydrochloric acid has a pH approaching 0.0. On the other end of the scale, milk of magnesia has a pH of 10.0, whereas household ammonia has a pH of 11.9. 21 Encyclopedia Americana 844 (Int'l ed. 1990).

FIG. 4

Justice Thomas delivered the opinion of the Court:

Nearly 50 years ago, this Court in Graver Tank & Mfg. Co. v. Linde Air Products Co., 339 U.S. 605, 70 S.Ct. 854, 94 L.Ed. 1097 (1950), set out the modern contours of what is known in patent law as the "doctrine of equivalents." Under this doctrine, a product or process that does not literally infringe upon the express terms of a patent claim may nonetheless be found to infringe if there is equivalence between the elements of the accused product or process and the claimed elements of the patented invention. Id., at 609, 70 S.Ct., at 856-857. Petitioner, which was found to have infringed upon respondent's patent under the doctrine of equivalents, invites us to speak the death of that doctrine. We decline that invitation. The significant disagreement within the Court of Appeals for the Federal Circuit concerning the application of Graver Tank suggests, however, that the doctrine is not free from confusion. We therefore will endeavor to clarify the proper scope of the doctrine.

I

The essential facts of this case are few. Petitioner Warner-Jenkinson Co. and respondent Hilton Davis Chemical Co. manufacture dyes. Impurities in those dyes must be removed. Hilton Davis holds United States Patent No. 4,560,746 ('746 patent), which discloses an improved purification process involving "ultrafiltration." The '746 patent filters impure dye through a porous membrane at certain pressures and pH levels, [FN1] resulting in a high purity dye product.

> FN1 The pH, or power (exponent) of Hydrogen, of a solution is a measure of its acidity or alkalinity. A pH of 7.0 is neutral; a pH below 7.0 is acidic; and a pH above 7.0 is alkaline. Although measurement of pH is on a logarithmic scale, with each whole number difference representing a ten-fold difference in acidity, the practical significance of any such difference will often depend on the context. Pure water, for example, has a neutral pH of 7.0, whereas carbonated water has an acidic pH of 3.0, and concentrated hydrochloric acid has a pH approaching 0.0. On the other end of the scale, milk of magnesia has a pH of 10.0, whereas household ammonia has a pH of 11.9. 21 Encyclopedia Americana 844 (Int'l ed. 1990).

FIG. 5

Justice Thomas delivered the opinion of the Court:

Nearly 50 years ago, this Court in Graver Tank & Mfg. Co. v. Linde Air Products Co., 339 U.S. 605, 70 S.Ct. 854, 94 L.Ed. 1097 (1950), set out the modern contours of what is known in patent law as the "doctrine of equivalents." Under this doctrine, a product or process that does not literally infringe upon the express terms of a patent claim may nonetheless be found to infringe if there is equivalence between the elements of the accused product or process and the claimed elements of the patented invention. Id., at 609, 70 S.Ct., at 856-857. Petitioner, which was found to have infringed upon respondent's patent under the doctrine of equivalents, invites us to speak the death of that doctrine. We decline that invitation. The significant disagreement within the Court of Appeals for the Federal Circuit concerning the application of Graver Tank suggests, however, that the doctrine is not free from confusion. We therefore will endeavor to clarify the proper scope of the doctrine.

I

The essential facts of this case are few. Petitioner Warner-Jenkinson Co. and respondent Hilton Davis Chemical Co. manufacture dyes. Impurities in those dyes must be removed. Hilton Davis holds United States Patent No. 4,560,746 ("'746 patent"), which discloses an improved purification process involving "ultrafiltration." The '746 patent filters impure dye through a porous membrane at certain pressures and pH levels, [FN1] resulting in a high purity dye product.

> FN1. The pH, or power (exponent) of Hydrogen, of a solution is a measure of its acidity or alkalinity. A pH of 7.0 is neutral; a pH below 7.0 is acidic; and a pH above 7.0 is alkaline. Although measurement of pH is on a logarithmic scale, with each whole number difference representing a ten-fold difference in acidity, the practical significance of any such difference will often depend on the context. Pure water, for example, has a neutral pH of 7.0, whereas carbonated water has an acidic pH of 3.0, and concentrated hydrochloric acid has a pH approaching 0.0. On the other end of the scale, milk of magnesia has a pH of 10.0, whereas household ammonia has a pH of 11.9. 21 Encyclopedia Americana 844 (Int'l ed. 1990).

FIG. 6

Justice Thomas delivered the opinion of the Court:

Nearly 50 years ago, this Court in Graver Tank & Mfg. Co. v. Linde Air Products Co., 339 U.S. 605, 70 S.Ct. 854, 94 L.Ed. 1097 (1950), set out the modern contours of what is known in patent law as the "doctrine of equivalents." Under this doctrine, a product or process that does not literally infringe upon the express terms of a patent claim may nonetheless be found to infringe if there is equivalence between the elements of the accused product or process and the claimed elements of the patented invention. Id., at 609, 70 S.Ct. at 856-57. Petitioner, which was found to have infringed upon respondent's patent under the doctrine of equivalents, invites us to speak the death of that doctrine. We decline that invitation. The significant disagreement within the Court of Appeals for the Federal Circuit concerning the application of Graver Tank suggests, however, that the doctrine is not free from confusion. We therefore will endeavor to clarify the proper scope of the doctrine.

I

The essential facts of this case are few. Petitioner Warner-Jenkinson Co. and respondent Hilton Davis Chemical Co. manufacture dyes. Impurities in those dyes must be removed. Hilton Davis holds United States Patent No. 4,560,746 ("'746 patent"), which discloses an improved purification process involving "ultrafiltration." The '746 patent filters impure dye through a porous membrane at certain pressures and pH levels, [FN1] resulting in a high purity dye product.

FN1. The pH, or power (exponent) of Hydrogen, of a solution is a measure of its acidity or alkalinity. A pH of 7.0 is neutral; a pH below 7.0 is acidic; and a pH above 7.0 is alkaline. Although measurement of pH is on a logarithmic scale, with each whole number difference representing a ten-fold difference in acidity, the practical significance of any such difference will often depend on the context. Pure water, for example, has a neutral pH of 7.0, whereas carbonated water has an acidic pH of 3.0, and concentrated hydrochloric acid has a pH approaching 0.0. On the other end of the scale, milk of magnesia has a pH of 10.0, whereas household ammonia has a pH of 11.9. 21 Encyclopedia Americana 844 (Int'l ed. 1990).

FIG. 9

Justice Thomas delivered the opinion of the Court:

Nearly 50 years ago, this Court in Graver Tank & Mfg. Co. v. Linde Air Products Co., 339 U.S. 605, 70 S.Ct. 854, 94 L.Ed. 1097 (1950), set out the modern contours of what is known in patent law as the "doctrine of equivalents." Under this doctrine, a product or process that does not literally infringe upon the express terms of a patent claim may nonetheless be found to infringe if there is equivalence —40 between the elements of the accused product or process and the claimed elements of the patented invention. Id., at 609, 70 S.Ct., at 856-857. Petitioner, which was found to have infringed upon respondent's patent under the doctrine of equivalents, invites us to speak the death of that doctrine. We decline this invitation. The significant disagreement within the Court of Appeals for the Federal Circuit —42 concerning the application of Graver Tank suggests, however, that the doctrine is not free from confusion. We therefore will endeavor to clarify the proper scope of the doctrine.

I 36

The essential facts of this case are few. Petitioner Warner-Jenkinson Co. and respondent Hilton Davis Chemical Co. manufacture dyes. Impurities in those dyes must be removed. Hilton Davis holds United States Patent No. 4,560,746 ('746 patent), which discloses an improved purification process involving "ultrafiltration." The '746 patent filters impure dye through a porous membrane at certain pressures and pH levels, [FN1] resulting in a high purity dye product.

34

> FN1. The pH, or power (exponent) of Hydrogen, of a solution is a measure of its acidity or alkalinity. A pH of 7.0 is neutral; a pH below 7.0 is acidic; and a pH above 7.0 is alkaline. Although measurement of pH is on a logarithmic scale, with each whole number difference representing a ten-fold difference in acidity, the practical significance of any such difference will often depend on the context. Pure water, for example, has a neutral pH of 7.0, whereas carbonated water has an acidic pH of 3.0, and concentrated hydrochloric acid has a pH approaching 0.0. On the other end of the scale, milk of magnesia has a pH of 10.0, whereas household ammonia has a pH of 11.9. 21 Encyclopedia Americana 844 (Int'l ed. 1990).

FIG. 10

Justice Thomas delivered the opinion of the Court:

Nearly 50 years ago, this Court in Graver Tank & Mfg. Co. v. Linde Air Products Co., 339 U.S. 605, 70 S.Ct. 854, 94 L.Ed. 1097 (1950), set out the modern contours of what is known in patent law as the "doctrine of equivalents." Under this doctrine, a product or process that does not literally infringe upon the express terms of a patent claim may nonetheless be found to infringe if there is equivalence —— 40 between the elements of the accused product or process and the claimed elements of the patented invention. Id., at 609, 70 S.Ct., at 856-857. Petitioner, which was found to have infringed upon respondent's patent under the doctrine of equivalents, invites us to speak the death of that doctrine. We decline that invitation. The ——42 significant disagreement within the Court of Appeals for the Federal Circuit concerning the application of Graver Tank suggests, however, that the doctrine is not free from confusion. We therefore will endeavor to clarify the proper scope of the doctrine.

I   \—26

The essential facts of this case are few. Petitioner Warner-Jenkinson Co. and respondent Hilton Davis Chemical Co. manufacture dyes. Impurities in those dyes must be removed. Hilton Davis holds United States Patent No. 4,560,746 ('746 patent), which discloses an improved purification process involving "ultrafiltration." The '746 patent filters impure dye through a porous membrane at certain pressures and pH levels, [FN1] resulting in a high purity dye product.

> FN1  The pH, or power (exponent) of Hydrogen, of a solution is a measure of its acidity or alkalinity. A pH of 7.0 is neutral; a pH below 7.0 is acidic; and a pH above 7.0 is alkaline. Although measurement of pH is on a logarithmic scale, with each whole number difference representing a ten-fold difference in acidity, the practical significance of any such difference will often depend on the context. Pure water, for example, has a neutral pH of 7.0, whereas carbonated water has an acidic pH of 3.0, and concentrated hydrochloric acid has a pH approaching 0.0. On the other end of the scale, milk of magnesia has a pH of 10.0, whereas household ammonia has a pH of 11.9. 21 Encyclopedia Americana 844 (Int'l ed. 1990).

FIG. 11

Justice Thomas delivered the opinion of the Court:

Nearly 50 years ago, this Court in Graver Tank & Mfg. Co. v. Linde Air Products Co., 339 U.S. 605, 70 S.Ct. 854, 94 L.Ed. 1097 (1950), set out the modern contours of what is known in patent law as the "doctrine of equivalents." Under this doctrine, a product or process that does not literally infringe upon the express terms of a patent claim may nonetheless be found to infringe if there is equivalence between the elements of the accused product or process and the claimed elements of the patented invention. Id. at 609, 70 S.Ct. at 856-857. Petitioner, who was found to have infringed upon respondent's patent under the doctrine of equivalents, invites us to speak the death of that doctrine. We decline that invitation. The significant disagreement within the Court of Appeals for the Federal Circuit concerning the application of Graver Tank suggests, however, that the doctrine is not free from confusion. We therefore will endeavor to clarify the proper scope of the doctrine.

—38

I

The essential facts of this case are few. Petitioner Warner-Jenkinson Co. and respondent Hilton Davis Chemical Co. manufacture dyes. Impurities in those dyes must be removed. Hilton Davis holds United States Patent No. 4,560,746 ('746 patent), which discloses an improved purification process involving "ultrafiltration." The '746 patent filters impure dye through a porous membrane at certain pressures and pH levels, [FN1] resulting in a high purity dye product.

> FN1 The pH, or power (exponent) of Hydrogen, of a solution is a measure of its acidity or alkalinity. A pH of 7.0 is neutral; a pH below 7.0 is acidic; and a pH above 7.0 is alkaline. Although measurement of pH is on a logarithmic scale, with each whole number difference representing a ten-fold difference in acidity, the practical significance of any such difference will often depend on the context. Pure water, for example, has a neutral pH of 7.0, whereas carbonated water has an acidic pH of 3.0, and concentrated hydrochloric acid has a pH approaching 0.0. On the other end of the scale, milk of magnesia has a pH of 10.0, whereas household ammonia has a pH of 11.9. 21 Encyclopedia Americana 844 (Int'l ed. 1990).

FIG. 12

Justice Thomas delivered the opinion of the Court:

Nearly 50 years ago, this Court in Graver Tank & Mfg. Co. v. Linde Air Products Co., 339 U.S. 605, 70 S.Ct. 854, 94 L.Ed. 1097 (1950), set out the modern contours of what is known in patent law as the "doctrine of equivalents." Under this doctrine, a product or process that does not literally infringe upon the express terms of a patent claim may nonetheless be found to infringe if there is equivalence between the elements of the accused product or process and the claimed elements of the patented invention. Id., at 609, 70 S.Ct., at 856-857. Petitioner, which was found to have infringed upon respondent's patent under the doctrine of equivalents, invites us to speak the death of that doctrine. We decline that invitation. The significant disagreement within the Court of Appeals for the Federal Circuit concerning the application of Graver Tank suggests, however, that the doctrine is not free from confusion. We therefore will endeavor to clarify the proper scope of the doctrine.

I  36

The essential facts of this case are few. Petitioner Warner-Jenkinson Co. and respondent Hilton Davis Chemical Co. manufacture dyes. Impurities in those dyes must be removed. Hilton Davis holds United States Patent No. 4,560,746 ("'746 patent"), which discloses an improved purification process involving "ultrafiltration." The '746 patent filters impure dye through a porous membrane at certain pressures and pH levels, [FN1] resulting in a high purity dye product.

34

FN1 The pH, or power (exponent) of Hydrogen, of a solution is a measure of its acidity or alkalinity. A pH of 7.0 is neutral; a pH below 7.0 is acidic; and a pH above 7.0 is alkaline. Although measurement of pH is on a logarithmic scale, with each whole number difference representing a ten-fold difference in acidity, the practical significance of any such difference will often depend on the context. Pure water, for example, has a neutral pH of 7.0, whereas carbonated water has an acidic pH of 3.0, and concentrated hydrochloric acid has a pH approaching 0.0. On the other end of the scale, milk of magnesia has a pH of 10.0, whereas household ammonia has a pH of 11.9. 21 Encyclopedia Americana 844 (Int'l ed. 1990).

FIG. 12B

HIGHLIGHTING COMPARISON METHOD

CROSS-REFERENCS TO RELATED APPILICATIONS

This application is a continuation-in-part of an earlier filed non-provisional application. The prior application was assigned Ser. No. 10/153,939. It was filed on May 23, 2002 now U.S. Pat. No. 7,080,317, and it listed David G. Lebow as the inventor.

STATEMENT REGARDING FEDERALLY SPONSORED RESEARCH OR DEVELOPMENT

Not Applicable

MICROFICHE APPENDIX

Not Applicable

BACKGROUND OF THE INVENTION

1. Field of the Invention

This invention relates to the field of text and image analysis. More specifically, the invention comprises a method for comparing and evaluating the perceptions of a material analyzed by a group of individuals.

2. Description of the Related Art

Methods for emphasizing certain passages within a larger body of text or other material have likely existed for as long as the written word itself. Circling or underlining certain passages is an accepted convention for emphasis. In recent years, the adoption of brightly colored "highlighting" markers has largely supplanted the older processes.

Annotating bodies of text or images with footnotes or other commentary written in the margins is also a long-standing practice. Some texts which are a frequent object of commentary or criticism—such as religious works—are often printed with copious margins specifically intended to accommodate added handwritten notes. In recent years, both the practice of emphasizing certain passages and the practice of adding commentary have been automated through the use of computers. As one example, many word processing programs allow a user to emphasize text via displaying it in a different color. Some programs display input from different users in different colors—with the result that the author of each passage may be easily determined. Thus, the use of color to differentiate text and the use of added commentary or criticism are both well known in the prior art.

BRIEF SUMMARY OF THE INVENTION

The present invention has three primary components: (1) A method for using color (or other type of emphasis element) to study a group's perception, reaction, or response to a body of material (such as text, an image, a video, or an audio segment); (2) A method for aggregating group data (i.e., highlighted selections and comments linked to the highlighted selections) and comparing a selected individual's data or sub-group data to data collected from one individual, a sub-group, or the group as a whole; and (3) A method for applying annotations including color (or other type of emphasis element) to a body of material to further (a) facilitate an understanding or analysis of the material (b) assess/measure performance of contributors or evaluate quality of the body of material, and (c) revise or enhance the material.

BRIEF DESCRIPTION OF THE SEVERAL VIEWS OF THE DRAWINGS

The file of this patent contains at least one drawing executed in color. Copies of this patent with color drawings(s) will be provided by the Patent and Trademark Office upon request and payment of the necessary fee.

FIG. 2 is a page of text, showing emphasis added by User 1.

FIG. 3 is a page of text, showing emphasis added by User 2.

FIG. 4 is a page of text, showing emphasis added by User 3.

FIG. 5 is a page of text, showing emphasis added by User 4.

FIG. 6 is a page of text, showing emphasis added by User 5.

FIG. 9 is a page of text, illustrating the result of the physical combination shown in FIG. 8.

FIG. 10 is a page of text, showing how computer software can be substituted for the physical combination.

FIG. 11 is a page of text, showing a second type of computer combination.

FIG. 12 is a page of text, showing a third type of computer combination

FIG. 12B is a page of text, showing a fourth type of computer combination.

REFERENCE NUMERALS IN THE DRAWINGS

Figure 1:
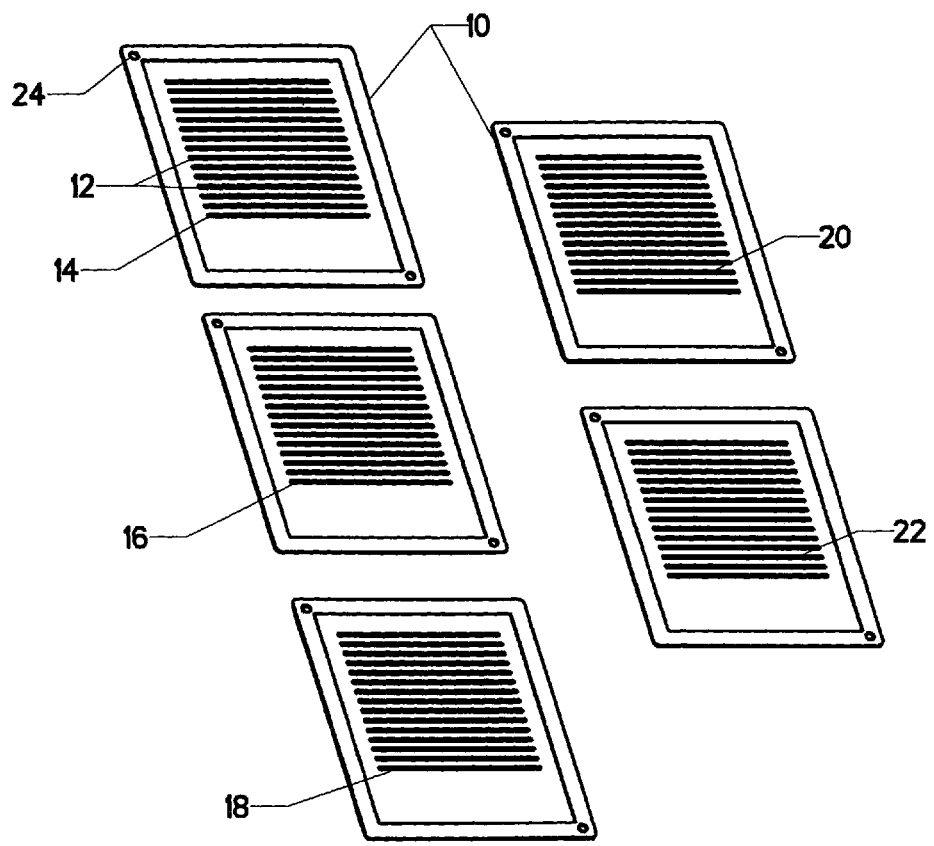
FIG. 1 is perspective view, showing the first step in a mechanical implementation of the present invention.

| | | | |
|---|---|---|---|
| 10 | transparency | 12 | text |
| 14 | user 1 text | 16 | user 2 text |
| 18 | user 3 text | 20 | user 4 text |
| 22 | user 5 text | 24 | alignment hole |
| 26 | emphasized text | 28 | fixture |
| 30 | alignment pin | 32 | light source |
| 34 | one vote region | 36 | two vote region |
| 38 | agreement region | 40 | three vote region |
| 42 | four vote region | 44 | main window |
| 46 | pop-up window | 48 | user name |
| 50 | user number | 52 | annotation |
| 54 | yellow highlighted region | 56 | green highlighted region |
| 58 | cursor | 60 | green highlighted region |
| 62 | selection list | 64 | identification bar |
| 66 | open icon | 68 | time stamp |

-continued

| 70 | comment | 72 | highlight tool |
| 74 | comment box | 76 | image portion |
| 78 | "submit" command button | 80 | blue shaded region |
| 82 | green shaded region | 84 | yellow shaded region |
| 86 | incorrect region | | |

DETAILED DESCRIPTION OF THE INVENTION

The proposed invention could be implemented using many different technologies. In its simplest form, a purely mechanical implementation may be used. Although this implementation is somewhat impractical given the availability of more modern technologies, it is useful as a starting point to understand the invention.

FIG. 1 shows five different transparencies 10 (mounted in frames). Each transparency 10 contains identical printed text 12. The five transparencies 10 are given to five separate users. The users are then given a set of criteria for evaluating the text. In this particular example, the users are asked to emphasize portions of the text believed to be important. Many emphasis methods could be used—such as circling, underlining, or highlighting in color (generically referred to herein as "emphasis elements"). For this particular example, the five users are asked to highlight portions deemed important in transparent yellow ink.

The result will be that the identical text is altered by the selective application of emphasis elements by the different users. Five distinct transparencies are thereby produced—user 1 text 14, user 2 text 16, user 3 text 18, user 4 text 20, and user 5 text 22. FIGS. 2 through 6 show the text on the transparencies with the applied emphasis elements. FIG. 2 shows the text with color-coded portions denoted as emphasized text 26. It represents the selections made by user 1. FIGS. 3, 4, 5, and 6 represent the selections made by users 2, 3, 4, and 5, respectively.

At this point, a set of data regarding a textual analysis performed by these individuals has been collected. A user of the invention might then want to know how the selections of one individual compared to the selections made by the group as a whole. Assume, as an example, that one wants to know how the selections made by user 1 (shown in FIG. 2) compare to the group as a whole. User 1's selection is left as shown in FIG. 2 (highlighted in yellow). FIGS. 3 through 6, however, are altered so that the selections made appear in light blue transparent ink (via a copying process or other means).

Figure 7:
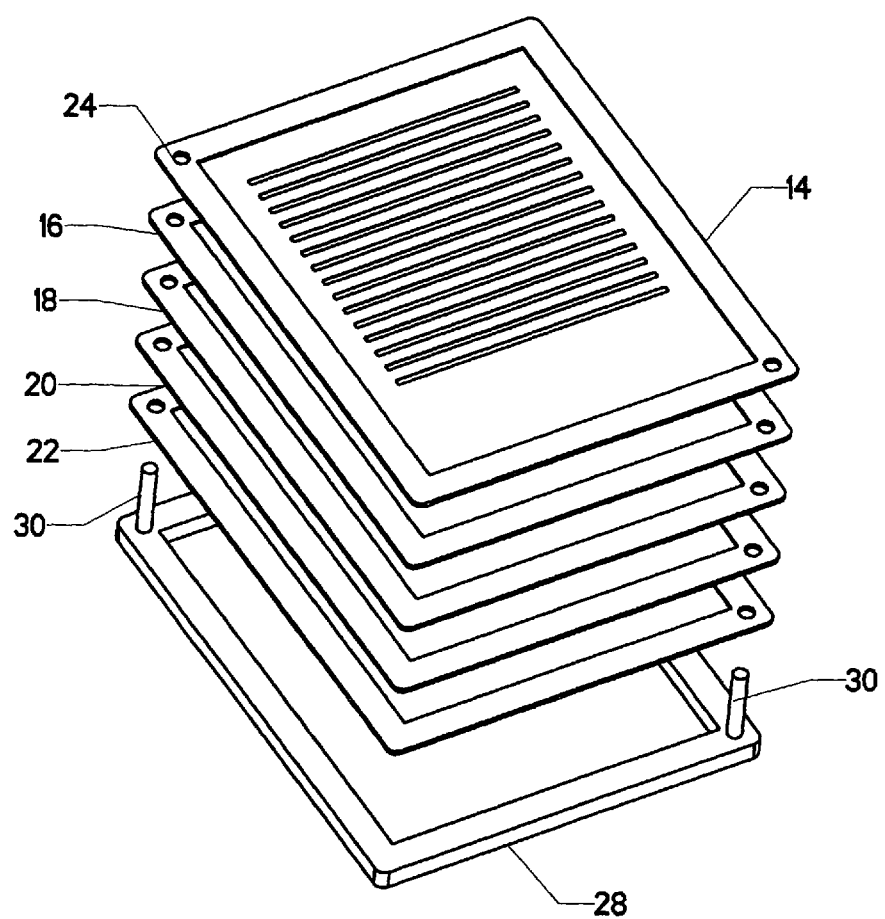
FIG. 7 is a perspective view, showing how text from various users can be combined for comparison.
Figure 8:
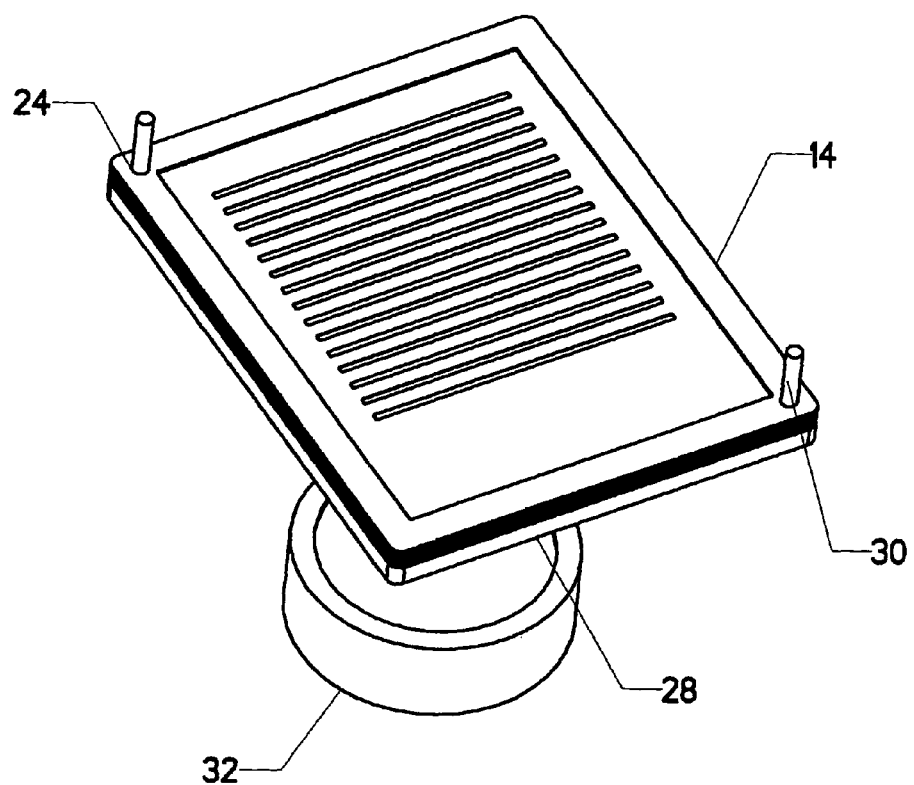
FIG. 8 is a perspective view, showing how light can be used to physically compare the text from various users.

The resulting transparencies are then stacked vertically, as shown in FIG. 7. The frame of each transparency has an alignment hole 24. These are placed over alignment pins 30 in fixture 28, thereby ensuring that the transparencies are perfectly aligned. The ordering of the transparencies in the stack is not significant, although they are shown stacked in order. Once the stack is complete, light source 32 is directed upward through the stack as illustrated in FIG. 8.

The user then views the stack from the top, with the result that the colored selections made by each user will be visible and will be combined. FIG. 9 shows the view afforded the user in this example. The yellow portion—denoted as emphasized text 26—indicates a selection made by user 1 but no one else. The lightest blue portions—denoted as one vote regions 34—indicates that only one of users 2 through 5 selected these sections for emphasis (the lightest blue color being the color to which the yellow original color was altered for users 2 through 5).

The medium blue portions—denoted as two vote regions 36—indicate that two of users 2 through 5 selected these sections. Those skilled in the art will realize that the darker shade results from the fact that two of the lightest blue portions are overlapped in the stack. The darkest blue portions—denoted as three vote regions 40—indicate that three of users 2 through 5 selected these portions. Obviously, an even darker shade would exist if all four of users 2 through 5 selected a portion (which did not happen in this example).

Agreement region 38 is particularly significant. It has a green color, indicating that a yellow portion highlighted by user 1 has overlapped with selections made by the other users (resulting from the fact that light shining through a yellow transparent dye and a blue transparent dye will produce green). The darker the shade of green, the greater the consensus on that selection. Thus, the resulting combined analysis could inform user 1 of the following: (1) He or she emphasized one portion of the text that no other user deemed important; (2) He or she emphasized one portion concerning which there was considerable consensus; and (3) He or she failed to emphasize a portion which 3 of the 4 other users deemed important. Obviously, other information could be gleaned from the graphical representation as well.

Applying this basic mechanical technique could also produce many other results. As one more specific example—one studying the group might want to graphically illustrate the selections of the group as a whole. In that event, all the highlighted transparencies could be left in the same color. Then, when they are stacked as shown in FIG. 7, the areas concerning which there is consensus would appear as darker and darker shades of the highlighting color.

Those skilled in the art will realize that many more users could be evaluated using this same technique. However, one would ultimately reach a limit of light transmission through a very large stack of transparencies. With the availability of computer graphics, the use of physical transparencies is obviously not a preferred method for carrying out the invention. It is now easy to have the text selections made by a user sitting at a computer and viewing the text on a monitor. The user can then highlight the selected text using a keyboard, mouse, or other input device. Computer software can then be employed to combine the selections and present the data in a graphical format. The data can be collected from users sitting at different computers (via the Internet or other datalink) or by a succession of users sitting at one computer.

The computer would display the text on the screen and the user is again given a set of criteria which guides the user in applying the emphasis elements to the text. For this particular example, assume that the user is asked to drag a mouse pointer over selected portions deemed important with the result that the computer then displays those portions in yellow. Further assume that there are again five users, and that the selections made again conform to that displayed in FIGS. 2 through 6. Computer software is then used to combine the results.

The process can also be combined with annotation (i.e., the addition of comments linked to highlighted selections) to create more flexibility. When a user highlights a particular piece of text deemed important, it is not necessarily apparent why the particular user deemed that portion to be important. Accordingly, the software can be configured to allow annotation of each selected portion. For example, when the user captures a section of text in a selected source document and clicks an annotate button, a comment box opens and the user submits a comment. The comment is now linked to the highlighted selection. Thus the value of the color-coded highlighting is greatly enhanced by linking the users' highlighted selections to their comments (i.e., the system makes thinking that is ordinarily hidden, become transparent and available for self-reflection, sharing, and feedback).

In this example, one studying the group results only wants to evaluate group consensus (i.e., they are not trying to evaluate one individual's responses against the group as a whole). The software can be configured to display the number of votes for each portion in a different color. Because this example does not employ a physical combination process, virtually any shade of color could be selected to represent the number of votes (limited only by the computer's ability to display them and the user's ability to discern among differing shades).

FIG. 10 shows one possible graphical display of the result. The software has been configured to display the following colors: (1) One-vote regions 34 are displayed in yellow; (2) Two-vote regions 36 are displayed in light green; (3) Three-vote regions 40 are displayed in light blue; and (4) Four-vote regions 42 are displayed in medium blue. Using this graphical result, a user can evaluate the level of consensus or discord regarding the group's opinions.

Of course, for a larger group of 30 or 40 users, it is generally preferable to show the results as increasingly darker shades of the same color. In that way, one viewing the results intuitively realizes where there is consensus (via observing the regions of darker color) without having to refer to a color key. The use of varying shades of the color gray have been found to be particularly effective, as they produce a natural visual hierarchy.

FIG. 11 shows a computer graphical display comparing selections made by user 1 to selections made by the group as a whole. In this display, the user has configured the software to display only: (1) selections made by user 1 but no one else (yellow); (2) selections receiving three votes (light blue); and selections receiving four votes (medium blue).

FIG. 12 shows a computer graphical display comparing selections made by user 1 to the selections made by the group, but adding the color green to indicate those portions selected by user 1 and other members of the group (agreement region 38). Graduations in the shade of the color green could be employed to indicate the degree of agreement between user and other group members (i.e., darker shades of green indicate a greater number of the other users selected that portion for emphasis).

For a large group of users, experience indicates that the results may be rapidly perceived in graduations of a single color. FIG. 12B shows such a result for a large group. The software has been configured to display the results by applying three progressively darker shades of blue to passages receiving progressively more votes. The color graduations can be made in 5 vote increments; i.e., 5 votes are needed for the lightest color, 10 votes are needed for the next darker shade, 15 votes are needed for the shade beyond that, and so on.

Alternatively, the graduations of color may be scaled to the total group size. For example, light blue indicates that one participant to a third of the participants selected that area. Medium blue indicates that more than one third and up to two thirds of the participants selected that area. Finally, dark blue indicates that more than two thirds of the participants selected that area. The result is that this method can be applied to groups comprising thousands of members.

The reader will by this point appreciate the fact that the results of the process can be displayed in a variety of ways. The use of color highlighting has been discussed in detail. The results could also be displayed via the use of underlining or circling (other common emphasis elements). If, on the other hand, there is a desire to display the results by viewing a text without immediately viewing visible emphasis elements, one can configure the computer software to display the number of "votes" for a word or phrase as a raw number which appears whenever the user drags the cursor over that portion.

Although the preceding descriptions provide a basic understanding of the process, those skilled in the art will appreciate that the process can be applied in many different contexts. The following examples provide some illustrations of the application of the process.

EXAMPLE ONE

The process can be used to teach active reading. A sample argumentative essay is given to a group of students. The students are then asked to highlight the claims and supports found in the text using a different highlighting color for each. Computer software is then used to produce a graphical display showing consensus or lack of consensus as to each portion of the text. For example, if students mark claims in yellow and supports in blue, when the software aggregates the highlighting of the group, those areas in dark shades of yellow (i.e., marked as claims) and dark shades of blue (i.e., marked as support) would indicate high consensus. Sections marked in light shades of yellow and light shades of blue would indicate that a smaller number (or percentage) of participants had identified those areas as claims or supports. If, however, some participants marked an area in yellow to indicate a claim and other participants marked the same area in blue to indicate a support, the contested area would appear in shades of green (i.e., yellow and blue combined).

The software can also be used to generate a graphical display comparing the selections made by one particular user against the group selections or a selected sub-group. For example, a text fragment highlighted by the logged in user but not by anyone else in a group, appears in yellow. Excerpts not highlighted by the user, but marked by one or more group members, appear in shades of blue (the darker the shade, the more "votes" for that fragment). Excerpts highlighted by the user and one or more group members appear in various shades of green (the darker the shade, the more "votes" for that fragment).

For many well-studied texts, there is a conventionally accepted view as to which portions constitute the claims and supports. For this type of text, the software could also be used to compare the group's selections against the standard view, as well as a specific individual's selections against the standard view. These graphical displays then become a teaching tool for teaching a student where he or she went wrong. They can also be an important tool for developing critical thought in those instances where the student disagrees with the accepted norm.

This application of the process would also be useful for a person desiring to study active reading. Such a researcher could observe the graphical display of the selections made by many hundreds of students in order to map their progress. Using the computer, many assessment processes could be applied to the data collected. A researcher might, as an example, be interested in performing a statistical analysis on a large body of students in order to determine the distribution of the selections the students made.

Throughout this specification, those skilled in the art will understand that other emphasis elements (such as underlining, circling, or different textures) could easily be substituted for the use of color-coded highlighting in the examples presented.

EXAMPLE TWO

The process can be used to facilitate understanding of negotiated documents, such as business contracts. A group of interested persons would be asked to emphasize the portions of the contractual document they deem important and explain why. If the group includes people from two different interested entities—such as two different companies negotiating a merger—they could be asked to highlight the important portions in a different color. The computer software would then create a graphical representation in which color is used to highlight significant points for both sides, as well as areas on which agreement or disagreement exists. One side could be configured to highlight in blue while the other highlights in yellow. Text which was highlighted by both sides would appear in green, with a darker shade indicating increased consensus about which sections of the document participants deemed important. By clicking on highlighted areas and reviewing comments linked to the sections, members of both sides could assess agreement and disagreement over various key points.

EXAMPLE THREE

The process can be used to survey constituent opinions when drafting a piece of legislation. Because the process can be remotely implemented over a computer network, a legislative representative could submit the proposed text of the legislation to a sample of the constituents. The constituents would be asked to highlight those portions they either like or dislike and, as described previously, add comments linked to each highlighted section. The comments would explain why the constituents like or dislike a selected highlighted section of the legislation. The process could then be employed to graphically display the aggregated results, using shades of gray or other color to indicate the distribution of "votes" for various sections of the document (i.e., the darker the shade, the more constituents highlighted the section). Clicking on a highlighted section would reveal all comments linked to the selected section.

Figure 13:
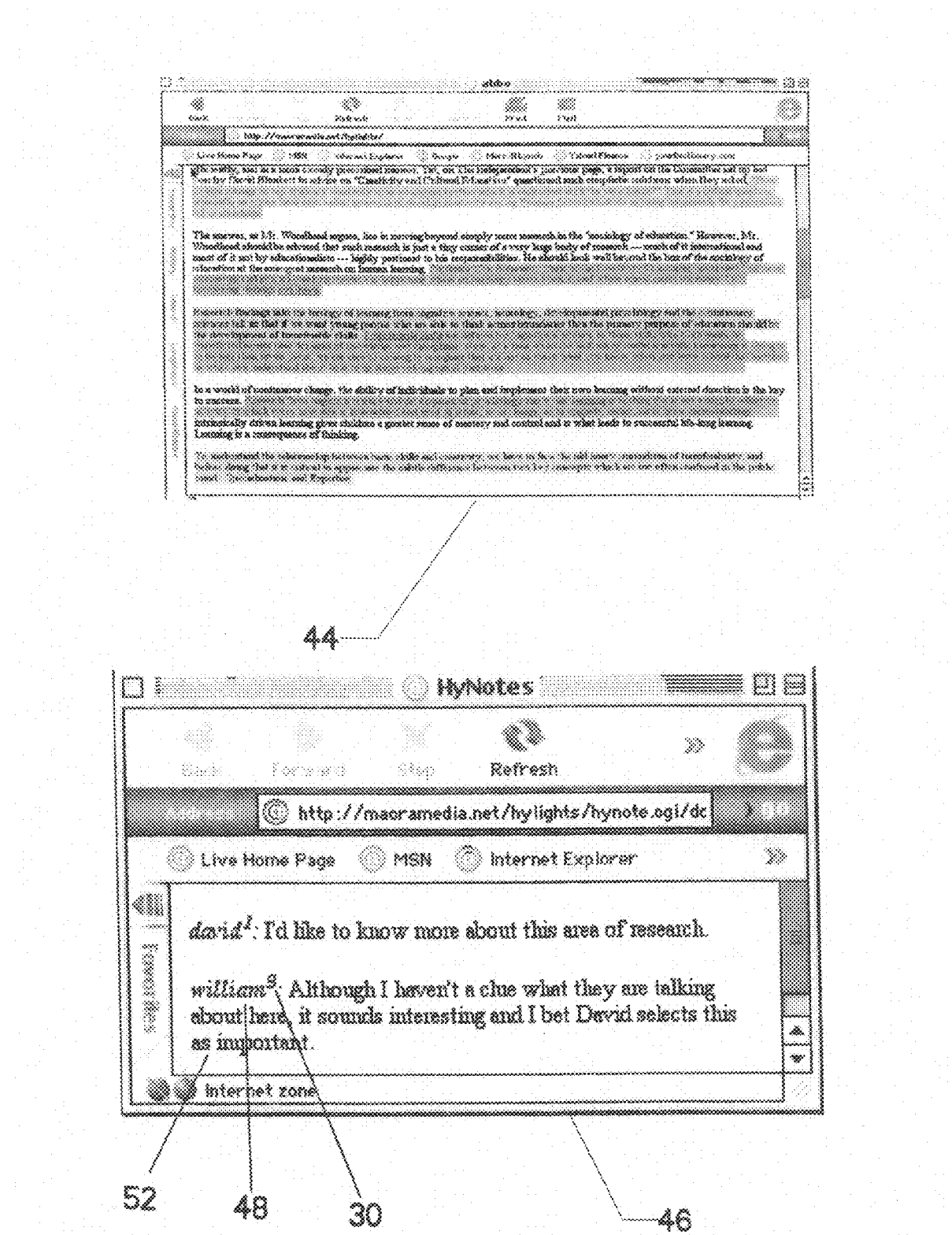
FIG. 13 is a graphical depiction of a computer user interface, showing how annotations can be made to a body of text.

Alternatively, the legislative representative (i.e., the administrator of the survey) could configure the system to present the aggregated results (i.e., the collective highlighting of participants in the survey) in relationship to the highlighting of the logged in user. Initially, the logged in user highlights sections of the legislation (i.e., the source document). These highlighted sections would appear in yellow. When the logged in user wishes to view his/her annotation in relationship to other participants, the user selects the "compare all" command from a menu. Referring now to FIG. 13, the reader will observe two user interface "windows." The upper window displays the text as presented to the logged in user. As described previously, the software has been used to graphically display the aggregated results of the highlighting activity. Sections (or text fragments) highlighted by the logged in reader but not the other participants appear in yellow; excerpts not highlighted by the selected reader, but marked by one or more participants, appear in shades of blue (the darker the shade of blue, the more "votes" for that text fragment); and excerpts highlighted by both the logged in user and one or more participants appear in various shades of green (the darker the shade of green, the more votes for that text fragment). Clicking on an area shows remarks of the root or logged in reader and other group members (e.g., clicking the dark green area in FIG. 2 displays the comments of three participants).

If a user selects a particular piece of highlighted text—using a mouse or other interface device—then pop-up window 46 appears. Pop-up window 46 displays the annotations which the users have linked to a selected area of highlighted text. A user number 30 is attached to the selected annotation. A user name 48 may also be attached. In this fashion, one viewing the results can study the comments made during the text emphasis process, and can discern which user made which comment. In this Example, William added a note indicating that he did not understand the selected portion of the passage but thought it sounded interesting. Those skilled in the art will know that pop-up windows are only one way of implementing this approach. The user interface could just as easily display dual windows showing the highlighting and comments linked to selected sections. The software could also allow for threaded discussions attached to selected annotations. Links to other texts could also be provided, so that a user who is interested in a particular annotation could, for example, learn more about the source materials.

In addition, text comparison algorithms, which are well known in the art, can be employed to determine which words or phrases were commonly used in the annotations. Words or phrases which are commonly used could then be selected for display in another window, again using color to indicate the frequency of use.

Although color has primarily been used to illustrate this process, those skilled in the art will realize that many different types of emphasis elements could be employed. As one additional example—underlining could be employed. The process could then thicken the underlining to show increasing consensus as to the selection of that piece of text. Italicized text could also be used, with an increasing pitch (or slant) angle being used to denote increasing consensus. Enlarged text with increasing enlargement to indicate increasing consensus could also be used. Finally, graphical symbols could be inserted into the text to denote the start point and the end point of selected text. If, as an example, a reader wanted to emphasize the phrase "brown fox" out of the sentence "The quick brown fox jumped over the lazy dog", it could be denoted as "The quick @brown fox@ jumped over the lazy dog." Increasing consensus could then be displayed by an increasing number of such symbols, such as "The quick @@brown fox@@ jumped over the lazy dog." The use of such symbols is particularly advantageous for documents that must be transferred to different types of software (owing to the fact that color instructions vary whereas ASCII character instructions are subject to a universal standard).

The aforementioned process may also be applied to materials other than text such as graphics or images (including graphics and images in hard copy, digital, or other format). For example, emphasis elements may be employed on photographs, drawings, paintings, diagrams, charts, and displays of still-frame video to study a group's perception, reaction, or response to the graphics or images. The group data can then be compiled, analyzed, and visually displayed in the same manner as with the text. The following examples provide the reader with a better understanding how the process may be used in a pictorial or graphical context.

EXAMPLE FOUR

The process can be used to collect a range of expert opinions on various types of graphics such as satellite surveillance photographs, architectural blueprints, x-rays or other medical imaging, and technical drawings. A group of qualified persons individually mark-up a selected graphic by highlighting areas which they wish to emphasize for various reasons (such as identifying problems, asking questions, or exploring alternative designs), and make relevant comments. Computer software is used to produce a graphical display showing the distribution of highlighting for the graphic and all associated comments. This provides the user with a broad view of the range of expert opinion concerning the selected graphic. This representation of the data provides a basis for further collaboration and editing. It may also be used to move a group toward a general consensus or develop areas for further research to resolve differences in opinion.

EXAMPLE FIVE

The following is a description of a system for training and testing competency in the area of mammography.

Figure 16:
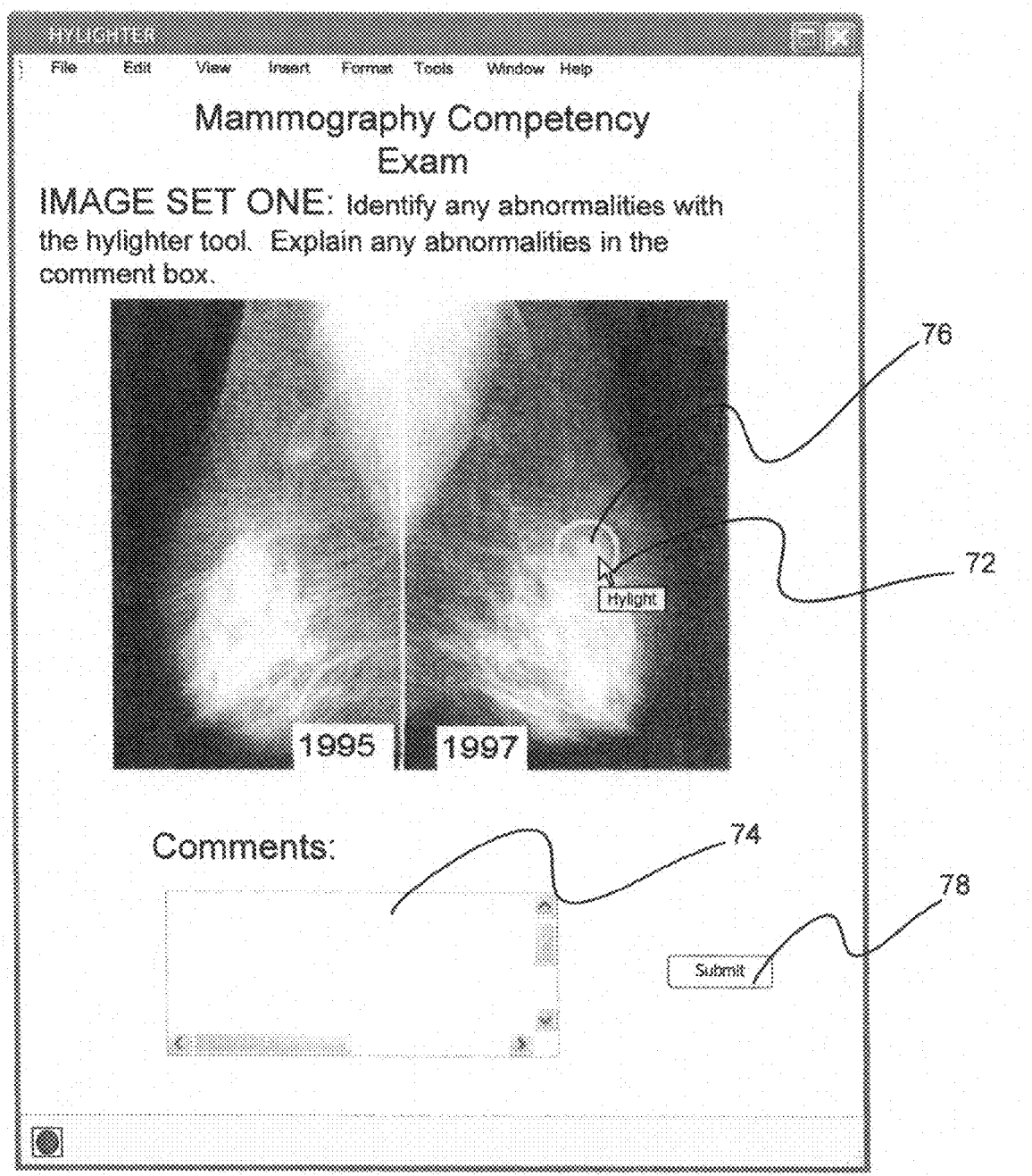
FIG. 16 is a graphical depiction of a computer user interface, showing how emphasis elements can be added to an image.

As part of their training, a user may be presented with images from a library of indexed and validated mammograms. FIG. 16 shows an example x-ray of a patient's breast taken on two different dates. The user selects a portion of the image which contains a perceived abnormality with highlight tool 72 and provides a written diagnosis in comment box 74. In the current example, the user selected image portion 76 with highlight tool 72. To use highlight tool 72, the user directs highlight tool 72 to the image portion which has the perceived abnormality using a mouse, and then presses the appropriate button on the mouse. The user then selects "submit" command button 78 to see how the user's selection compares with the validated image.

Figure 17:
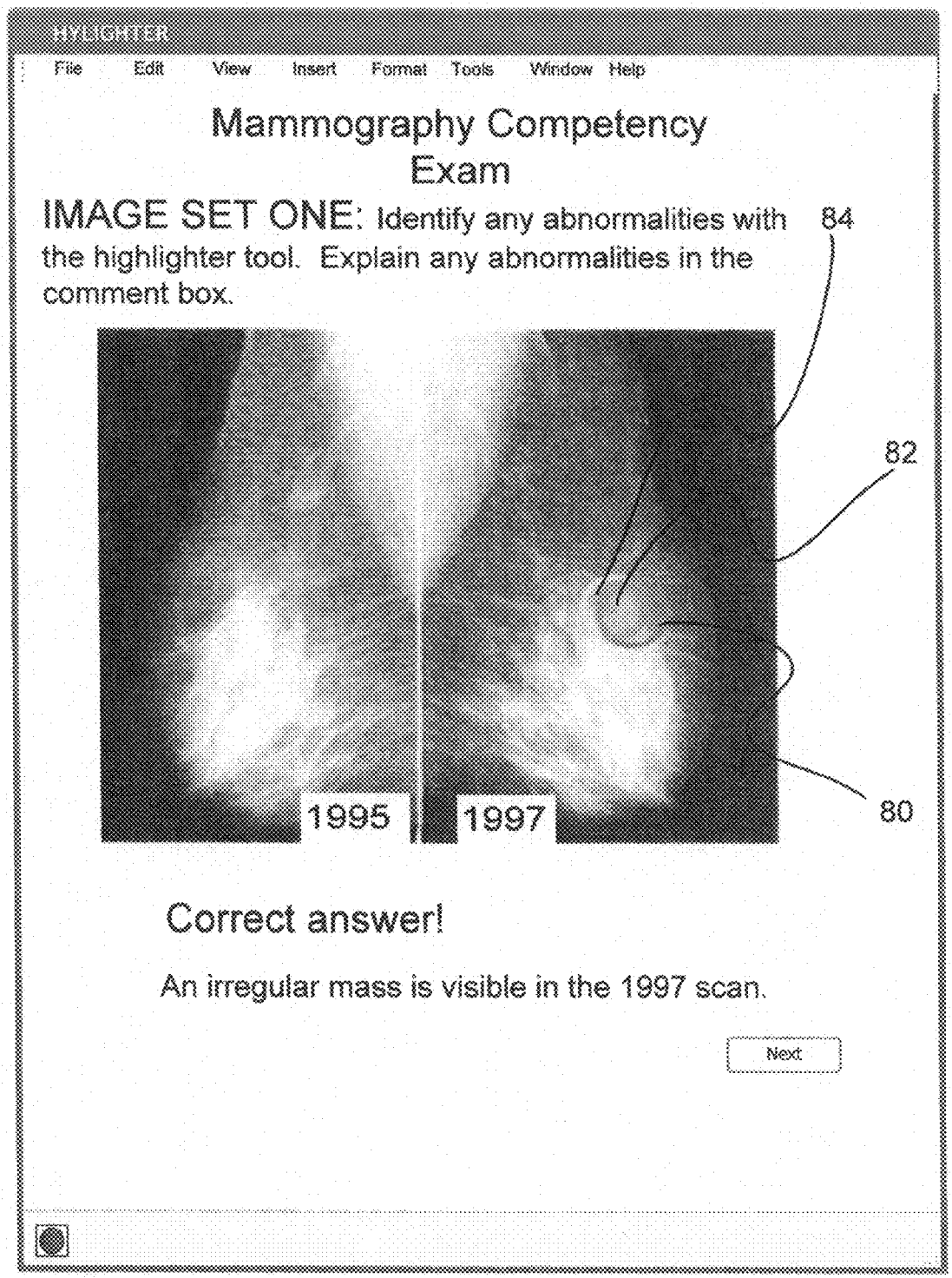
FIG. 17 is a graphical depiction of a computer user interface, illustrating how an emphasis element comparison can be displayed.

As shown in FIG. 17, the software provides immediate feedback to the user in a format in which the reader is now familiar. The correct selection is shown in blue shaded region 80. The user's selection is shown in 84 yellow shaded region. The overlap, illustrated as green shaded region 82, indicates areas in common between the user's perceived abnormality and the actual validated abnormality.

Figure 18:
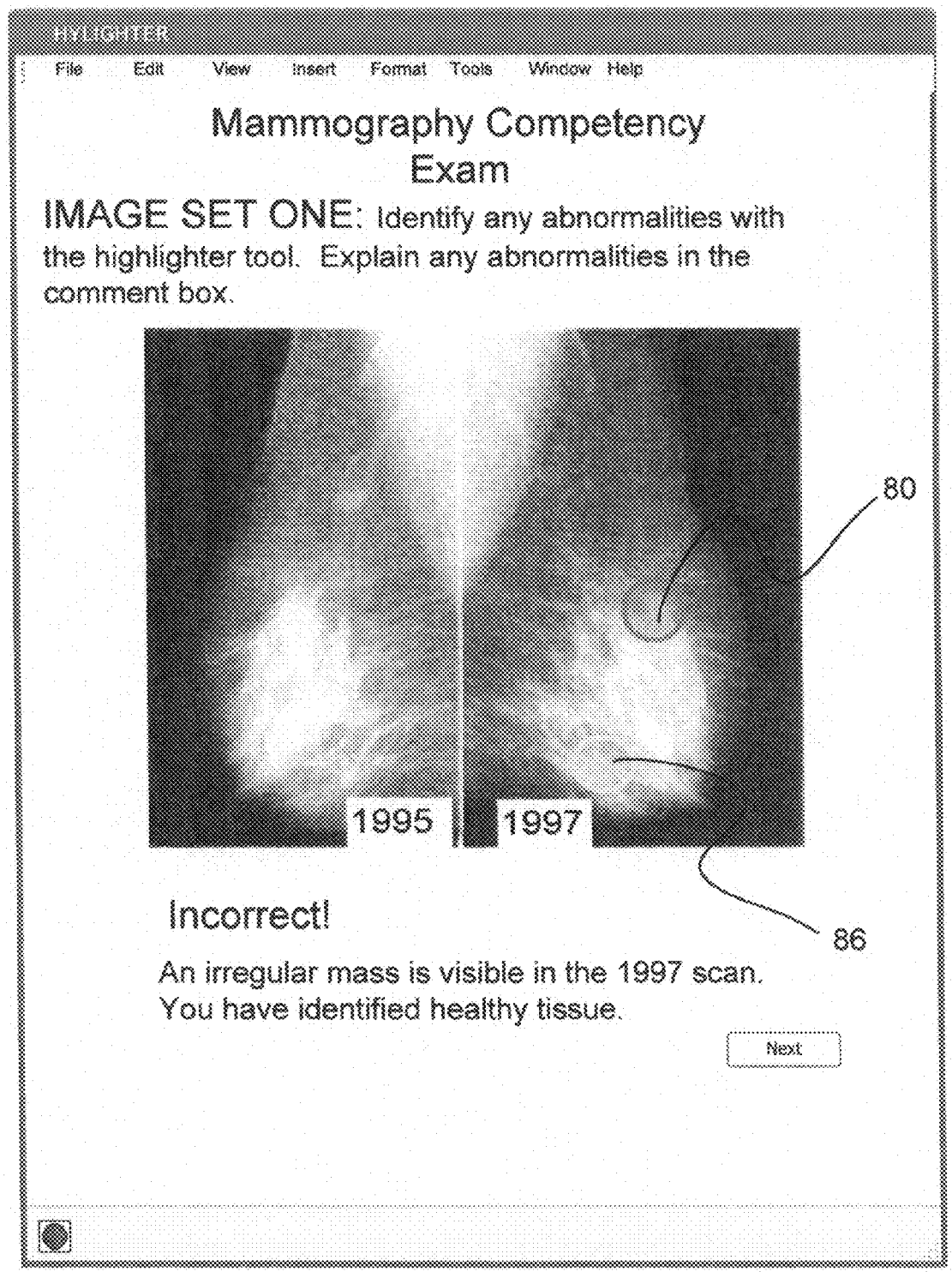
FIG. 18 is a graphical depiction of a computer user interface, illustrating how an emphasis element comparison can be displayed.

FIG. 18 illustrates a scenario where the user's identified abnormality does not match with the actual validated abnormality. In this example, the user identified incorrect region 86, indicated by the yellow highlighting. The abnormal region appears as blue shaded region 80. The user may also compare the written diagnoses to elucidate differences between the user's interpretation and the benchmark.

EXAMPLE SIX

The proposed process may also be used to evaluate a student's analysis of data. For example, the process may be used to test a student or group of students understanding of mass spectral data for drugs and their derivatives. Students may be presented with mass spectral data for a drug, such as cocaine. Students may then be asked to "identify the peaks that represent the molecular ion and the base peak for cocaine." Students may also be asked to "explain what the base peak and molecular ion peak represent."

The students may "identify" what they believe to be the correct peaks, by highlighting one or more of the peaks in the mass spectral graph. When a student highlights a peak, the program presents a comment box. The student can then enter their explanation of their answer in the comment box. A computer program can aggregate the data and produce a composite image that shows the answers for the group.

Figure 14:
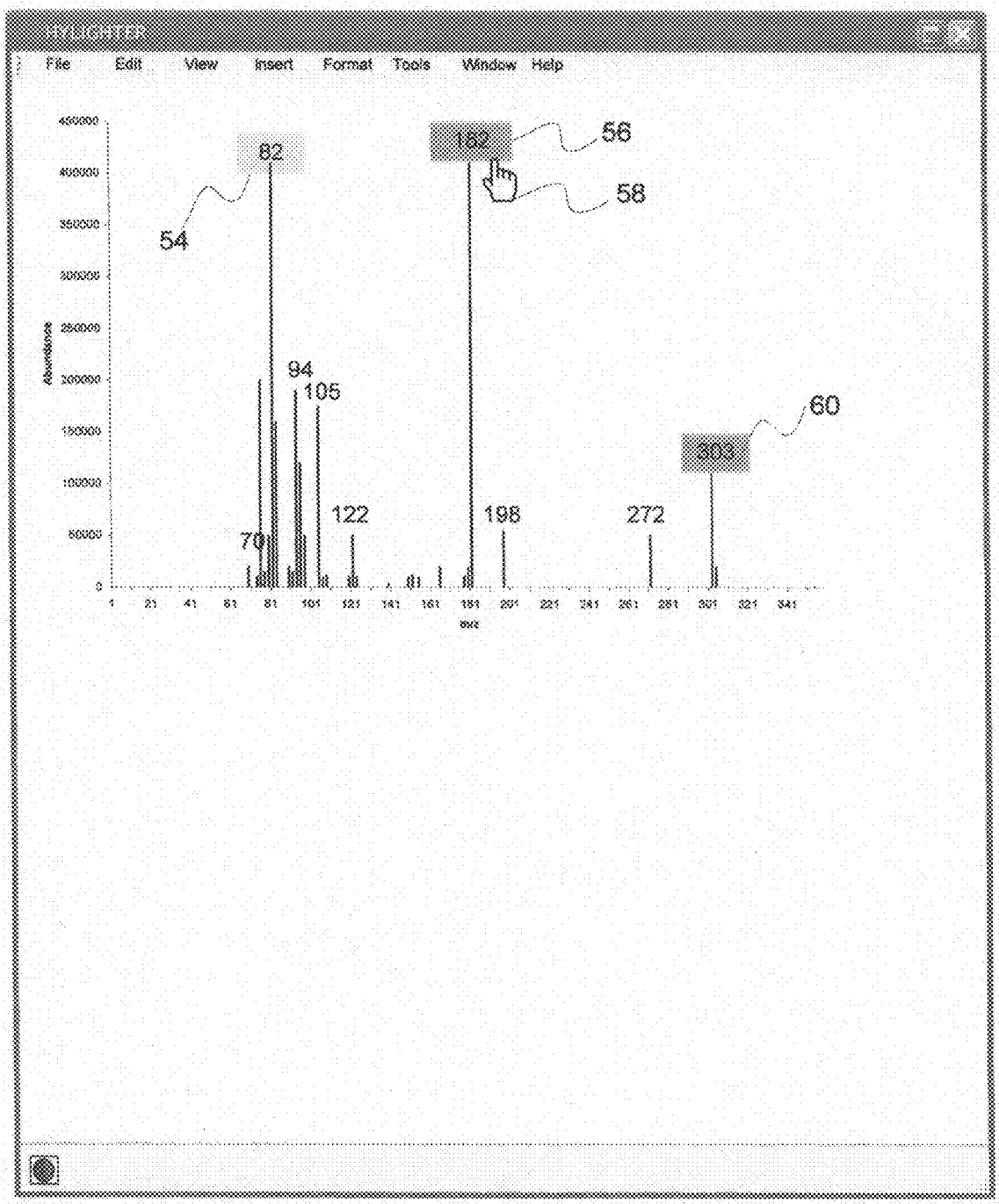
FIG. 14 is a graphical depiction of a computer user interface, illustrating a group's reaction to mass spectral data.

An example composite image is provided in FIG. 14. This shows an aggregated view from the perspective of the instructor—the logged in user. Yellow highlighted region 54 represents an area highlighted by the instructor but not highlighted by any of the students. Green highlighted region 56 represents one of the three base peaks of cocaine (the darker the green, the more students overlap with the instructor's selection). The green highlight indicates that at least one student identified the correct answer (i.e., the yellow highlighting of the instructor combined with the blue highlighting of one or more students creates a green area). Green highlighted region 60 represents another peak of cocaine. Like green highlighted region 56, green highlighted region 60 indicates that at least one student identified the correct answer.

The instructor or tester may desire to gain more information about the thinking of students making a particular selection. The instructor or tester may learn more about the selections by moving cursor 58 over one of the highlighted regions, and clicking the appropriate button on the mouse. For example, if the instructor or tester wanted to know more about the students who selected green highlighted region 56, the instructor or tester would move cursor 58 over green highlighted region 56 as shown in FIG. 14 and click the appropriate button on the mouse. This would open all comments linked to that section in a comment panel or pop up window.

Figure 15:
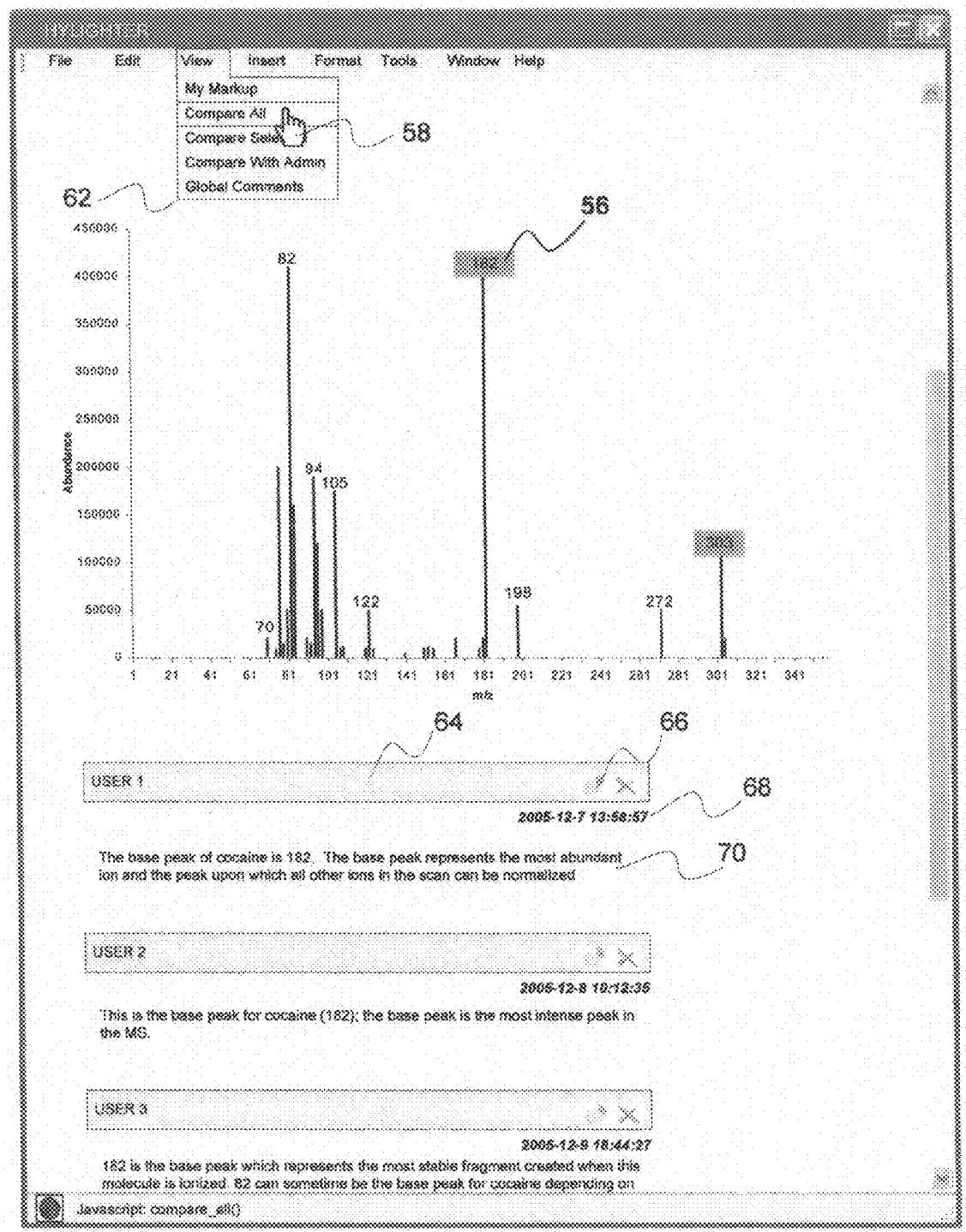
FIG. 15 is a graphical depiction of a computer user interface, showing how a group's perceptions can be reviewed.

When the instructor or tester views the image presented in FIG. 14, the instructor or tester is presented with several options. The instructor or tester may wish to view "My Markup" which shows the instructor's highlighting, "Compare All" which shows the aggregated highlighting of all participants in relationship to the instructor (i.e., the logged in user), and "Compare Selected" which shows the markup of the instructor compared to selected others. Additionally, each student has the option to select "Compare to Admin" which shows the student's highlighting in relationship to the instructors. Finally, users have the option to view Global Comments or general comments which are not linked to a specific section of the document but, rather, are concerned with the document as a whole. As illustrated in FIG. 15, selection list 62 is spawned when the user selects "View" from the menu bar, pulls down to Compare All, and clicks green area 182 to reveal all user comments linked to the selection.

In the current illustration, the instructor or tester selected "Compare Selected." The computer program generated a list of students who selected highlighted region 56, and provides more information about the students' selections. Identification bar 64 indicates a name or alias of a student making the selection. Open icon 66 may be used to view all selections and comments made by the student. Time stamp 68 indicates the time and date the student entered the selection. Comment 70 shows a student's written explanation for making the selection. Accordingly, the proposed process may be used to quickly evaluate a group of students' understanding of material.

EXAMPLE SEVEN

The process may also be used to study the effectiveness of graphics in enhancing the meaning of tests, supporting understanding of concepts, or improving problem-solving skills. For example, an instructor assigns students to solve a problem which is presented as text and a related graphic. The graphic could be a map for a geography or history problem, a diagram showing relationships between problem elements for a physics or math problem, or an illustration of a process for a biology problem. The students are then asked to highlight areas of the graphic that are most relevant to the problem and explain why. Computer software may be used to produce a graphical display showing the distribution of student selections and all associated comments. The instructor can use this information to diagnose problems and refine instruction to address students' misconceptions.

EXAMPLE EIGHT

The process can also be used to train border-crossing guards to identify fake identification documents (I.D.s) or test border-crossing guards' ability to identify fake I.D.s. In this example, ten images of I.D.s are presented to the group of trainees. The trainees are asked to highlight the area or areas of each I.D., which they believe is faulty and explain why. Computer software is then used to produce a graphical display showing the distribution of highlighting for each I.D. (as color-coded highlighting or other emphasis elements) and all comments associated with each I.D. This provides the instructor with an efficient and effective way to assess individual competence, evaluate the effectiveness of the instruction, and provide trainees with practice of key skills. Additionally, this process provides trainees with opportunities to share perspectives with their peers and receive instant feedback from the instructor.

EXAMPLE NINE

The foregoing examples relate to text and images which are stationary in time. The same process may also be used to study a group's perception of moving images and sounds (such as video or audio). For current purposes, video and audio are considered as streams of information which can be divided into segments. This segmentation can be either time-based or by numbered frames. For video running at 30 frames per second, a single frame or 1/30 of a second defines the granularity of the system (i.e., the smallest unit that a user can annotate).

In its simplest form, a purely mechanical implementation for the method could be similar to the process described with respect to FIGS. 1-9. Assume, for example, that five separate users are each given transparencies and marker pens. Each transparency corresponds to a 1 minute segment of a 10 minute video. Each transparency is numbered 1 through 10 corresponding to its temporal location within the video. The users are then given a set of criteria for evaluating the video. The users are then asked to highlight a horizontal bar along the bottom of each transparency with a transparent yellow ink to indicate that the segment meets one or more evaluation criteria.

All transparencies are then collected and sorted by segment number. The user may see the distribution of "votes" for the various segments by laying all of the marked transparencies for each segment over the video display using alignment holes (as before) beginning with segment number 1. If no yellow highlighting is present, the video segment received no votes. If one "vote" was registered for a segment, the highlighting would appear relatively light as compared with two, three, four, or five layers of yellow highlighting.

The user may also want to know how the selections made by one individual ("User 1") compared to the selections made by the group as a whole. For this application, User 1's transparencies remain highlighted in yellow and the transparencies of all the other users are altered by some means to appear in light blue ink. When the transparencies are placed over the video screen in proper alignment, segments with yellow horizontal bars would indicate a selection made by User 1 and no one else. A horizontal line shaded blue would indicate one of the other users selected the segment but User 1 did not (the darker the blue, the more users selected the segment). Various shades of green would indicate that a yellow portion (selected by User 1) overlapped with selections made by other users (the darker the green, the more users overlapped with User 1).

The usefulness and practicality of the method may not be readily apparent. However, when the method is adapted for use with a computer, it provides advantages for a groups evaluation and analysis of video and audio. With computer software, individual users may mark video segments identified by time code or frame numbers with highlighting or other form of emphasis and link comments to their marks. After a group has marked up a video in this manner, computer software may be used to combine the results. When viewing the video after mark-ups, the users would see each segment with a color-coded bar running along the bottom (or other location on the screen) indicating the distribution of "votes" for each segment. A user can now locate a particular segment and view all or selected comments added by the group members who marked the segment.

For audio, the stream of information may be represented as an audio waveform having an associated time-code. Additionally, a transcript of the sound or other representation such as lyrics and/or musical notes may be provided along with the waveform.

Accordingly, the proposed process may be used to evaluate a group's preference to portions of a video, such as a thirty-minute situational comedy. The group may be asked to identify parts of the situational comedy they find amusing or entertaining. Editors may then use the feedback of the group to determine which parts to edit out and which parts to include. For audio applications, the group may be asked to identify parts of a song that they dislike. This may help a band as they go through the recording process to identify material to build around and material that should be edited out.

Likewise, many other applications may be used incorporating the previously described process and examples. These variations would simply be additional embodiments of the inventive method disclosed herein. Accordingly, the scope of this invention should be fixed by the following claims, rather than by the examples given.

Having described my invention, I claim:

1. A method for visually displaying selections made by a group of users regarding portions of emphasized material selected by members of said group from a larger body of material, comprising:
   a. defining criteria for the appropriate selection of said emphasized material, wherein said material is selected from the group consisting of an image, a graphic, a picture, a diagram, and a video recording;
   b. providing means for each of said users within said group to review said larger body of material and independently emphasize selected portions of said larger body of material by using an emphasis element to delineate each of said selected portions, thereby creating a separate emphasis-modified material for each user;
   c. analyzing said emphasis-modified material for all of said users in order to determine how many of said users elected to emphasize a particular portion of material within said larger body of material; and
   d. visually displaying the results of said analysis, using a plurality of graduated emphasis elements to indicate an increasing level of consensus as to said selected portions.

2. A method as recited in claim 1, wherein said emphasis element provided to said users comprises a color used to highlight said selected portions, and wherein said visual displaying of said results comprises the use of a plurality of colors to indicate increasing levels of consensus.

3. A method as recited in claim 2, wherein said plurality of colors comprises a progressively darker shade of the same color, wherein a darker shade indicates said increasing level of consensus.

4. A method as recited in claim 3, further comprising providing means for each of said users to annotate said selections of material by adding additional text explaining said user's motive for making said selection.

5. A method as recited in claim 2, further comprising providing means for each of said users to annotate said selections of material by adding additional text explaining said user's motive for making said selection.

6. A method as recited in claim 1, further comprising:
  a. wherein said defining criteria include:
    i. a first criterion, to be used for the selection of a first type of material;
    ii. a second criterion, to be used for the selection of a second type of material;
  b. wherein said emphasis means provided to each of said users includes:
    i. a first color used to highlight material selected according to said first criterion;
    ii. a second color used to highlight material selected according to said second criterion;
  c. wherein said step of visually displaying said results includes:
    i. displaying said selections made according to said first criterion in a progressively darker shade of said first color, wherein a darker shade indicates said increasing level of consensus; and
    ii. displaying said selections made according to said second criterion in a progressively darker shade of said second color, wherein a darker shade indicates said increasing level of consensus.

7. A method as recited in claim 1, further comprising:
  a. wherein said defining criteria include:
    i. a first criterion, to be used for the selection of a first type of material;
    ii. a second criterion, to be used for the selection of a second type of material;
  b. wherein said emphasis means provided to each of said users includes:
    i. a first color used to highlight material selected according to said first criterion;
    ii. a second color used to highlight material selected according to said second criterion;
  c. wherein said step of visually displaying said results includes:
    i. displaying said selections made according to said first criterion in a plurality of different colors, wherein said colors are employed to indicate said increasing level of consensus; and
    ii. displaying said selections made according to said second criterion in a plurality of different colors, wherein said colors are employed to indicate said increasing level of consensus.

8. A method as recited in claim 1, further comprising providing means for each of said users to annotate said selections of material by adding additional text explaining said user's motive for making said selection.

9. A method as recited in claim 1, wherein said emphasis element provided to said users comprises circling used to mark said selected portions, and wherein said visual displaying of said results comprises the use of thicker lining to indicate increasing levels of consensus.

10. A method as recited in claim 1, wherein said emphasis element provided to said users comprises graphical symbols used to mark said selected portions, and wherein said visual displaying of said results comprises the use of increasingly numerous graphical symbols to indicate increasing levels of consensus.

11. A method for visually displaying selections made by a first user and a second user regarding portions of emphasized material selected by said first user and said second user from a larger body of material, comprising:
  a. defining criteria for the appropriate selection of said emphasized material, wherein said material is selected from the group consisting of an image, a graphic, a picture, a diagram, and a video recording;
  b. providing means for each of said first user and said second user to review said larger body of material and independently emphasize selected portions of said larger body of material by using an emphasis element to delineate each of said selected portions, thereby creating a first emphasis-modified material for said first user and a second emphasis-modified material for said second user;
  c. analyzing said first emphasis-modified material of said first user and said second emphasis-modified material of said second user to determine the level of agreement between selected portions emphasized by said first user and selected portions emphasized by said second user; and
  d. visually displaying the results of said analysis, using a first emphasis elements to indicate portions selected only by said first user, a second emphasis element to indicate portions selected only by said second user, and a third emphasis element to indicate portions selected by both said first user and said second user.

12. A method as recited in claim 11, wherein said first emphasis element comprises a first color used to highlight said selected portions selected by said first user.

13. A method as recited in claim 12, further comprising providing a means for said first user to annotate said selections of material by adding additional text explaining said first user's motive for making said selection.

14. A method as recited in claim 11, further comprising providing a means for said first user to annotate said selections of material by adding additional text explaining said first user's motive for making said selection.

15. A method as recited in claim 11, wherein said emphasis element provided to said first user comprises graphical symbols used to mark said selected portions.

* * * * *